United States Patent Office 3,639,529
Patented Feb. 1, 1972

3,639,529
METHOD FOR MANUFACTURING CROSS-LINKED CHLORINATED POLYMERIC SYSTEMS
Burton T. MacKenzie, Jr., Monroe, and Joseph E. Betts, Westport, Conn., assignors to General Electric Company
Filed July 29, 1970, Ser. No. 59,095
Int. Cl. C08f 29/12
U.S. Cl. 260—897 C                                    8 Claims

ABSTRACT OF THE DISCLOSURE

A chlorinated polymer is compounded with a lead salt stabilizer and a cross-linking agent, and then cured under steam pressure to effect cross-linking of the polymer. The resulting cross-linked product, bearing white surface areas or spots, is passed through a polar organic solvent, whereby the spots appearing on the surface of the cross-linked product are removed therefrom by the action of the solvent.

---

Figure 1:
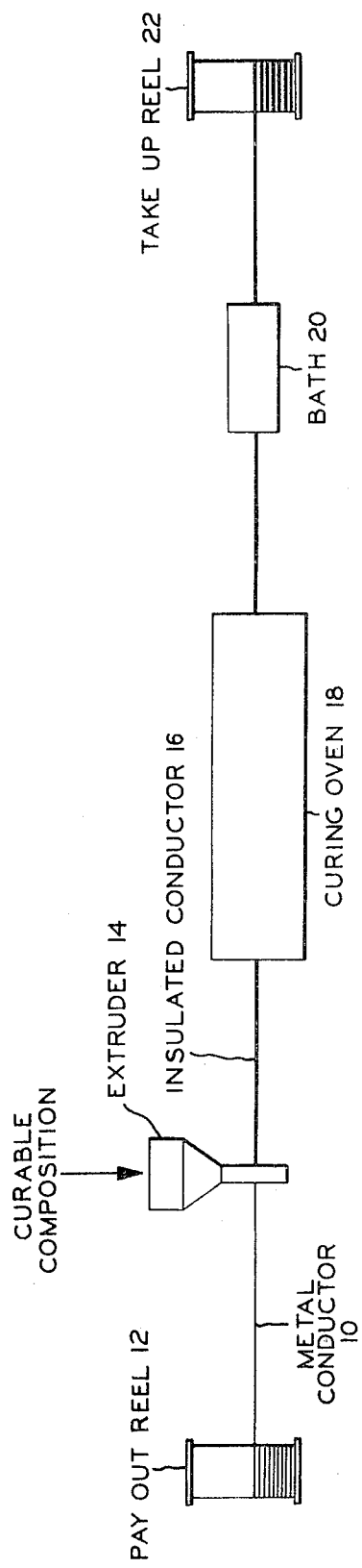

This invention releases to a method for manufacturing cross-linked chlorinated polymeric systems.

Chlorinated polymers, such as chlorinated polyethylene and polyvinyl chloride, are used extensively in the manufacture of molded and fabricated parts. More recently, there has been an increase in the use of chemically cross-linked halogenated polymeric systems. Generally, these cross-linked systems include a blend of one or more chlorinated polymers and usually with another polymer such as polyethylene. The chlorinated polymer attributes several desirable properties to the cured system. Clorinated polymers, usually as blends, are gaining importance in the wire and cable industry, because their polymers attribute to the cured product such properties as cut-through resistance, flame retardance, and oil resistance.

In the manufacture of chlorinated polymeric systems, the polymers are intimately admixed or compounded with the cross-linking agent and other additives as in a Banbury to flux or plasticize the composition, and a lead salt stabilizer for the chlorinated polymers is included to assure cross-linking of the polymer by neutralizing any free acid formed. The polymeric composition is fabricated to the desired shape, and when cured under steam pressure, white or grey areas appear on the surface, which detract from the appearance but apparently have no effect whatsoever on the properties of the product. The occurrence of white areas or spots increases with increased dwell time in the steam curing chamber, but longer dwell time is necessary with larger products. These white areas sometimes can be avoided by carefully selecting the ingredients, but this restriction on ingredients frequently limits product performance. The cross-linked product may be painted to cover up the white spots, but painting is relatively slow and expensive.

This invention has, therefore, as its object to provide a method for manufacturing cross-linked chlorinated polymeric systems which remove the white areas from the surface of the cross-linked product without affecting the properties thereof.

In accordance with the broad aspect of this invention, the chlorinated polymer selected from the group consisting of a chlorinated polyolefin, chlorosulfonated polyolefin, polyvinyl chloride, and blends thereof, is compounded with the lead salt stabilizer for the chlorinated polymer and the cross-linking agent such as an organic peroxide. Other additives may be incorporated into the system, as explained hereinbelow in greater detail. The compound is then fabricated or molded under steam pressure sufficient to effect cross-linking of the polymer. The resulting cross-linked product, bearing white surface areas or spots, is passed through an organic polar solvent, whereby the spots appearing on the surface of the cross-linked product are removed therefrom by the action of the solvent.

In preparing the composition, the chlorinated polymer, or a blend of polymers, is fluxed in a Banbury, and the lead stabilizer is added to the polymeric admixture and blending is continued at an elevated temperature. Where desired, the blend may include other polymers such as polyethylene or ethylene vinyl acetate, but this depends on the end product desired, as explained below. A suitable curing agent, desirably a tertiary peroxide, and other additives such as the antioxidant, pigment, coagent, etc., are incorporated into the mix. The composition is subsequently fabricated as, for example, by extrusion over a conductor to provide an insulated wire, and then cured under steam pressure to form a thermosetting or cross-linked insulation. The cross-linked product is then passed rapidly through a polar organic solvent from the group of ketones, aromatic ethers, aliphatic esters, polar chlorinated hydrocarbons and amine solvents, whereby spots appearing on the surface are removed. Suitable solvents include, for example, tetrahydrofuran, ethylene dichloride, methyl ethyl ketone, mehyl isobutyl ketone, 3-pentanone, cyclohexanone, butyl cellosolve acetate, butyl acetate, α-chloronaphthalene, dimethyl formamide, phenyl sulfide, perchloroethylene (hot, or vapor), chloroform, acetone, and 1,1,2,2-tetra-bromoethane. On the other hand, the following solvents were tried and found to be of no effect: silicone emulsion in water, methyl cellosolve, dimethyl sulfoxide, acetonitrile, decahydronaphthalene, tri-$p$-tolyl phosphite, tributyl phosphite, carbon tetrachloride, alkyl phenoxy polyethoxy ethanol, methanol, ethanol, xylene, benzene, toluene, isopropyl alcohol, and perchloroethylene at room temperature. No surface rubbing or buffing is required to produce a solid colored surface and the solvent readily evaporates or may be washed off with water.

The chlorinated polymers for the composition of this invention are well known and readily available. Polyvinyl chloride may be the suspension polymerized polymer, emulsion polymerized polymer or the bulk polymerized polymer, and desirably is of relatively high molecular weight such as having an inherent viscosity of 0.9 and above as determined by A.S.T.M.D. 1243, Method A. It should be understood that polyvinyl chloride with interpolymerizable monomers such as vinyl acetate, vinyl stearate, vinylidene chloride, acrylonitrile, ethyl acrylate, and the like, and containing not less than 90 percent by weight of vinyl chloride. The chlorinated polyolefin component may include any polymer or copolymer of the lower alpha olefins, containing from two to five carbon atoms, such as ethylene, propylene, isobutylene, and the like, and also may include chlorosulfonated polyethylene. Chlorinated polyethylene may be either the linear or non-linear variety, and desirably contains about 25 to 45 percent by weight of chlorine.

Blends of chlorinated polymers are particularly useful, which may include a blend of two or more chlorinated polymers or a blend of one or more chlorinated polymers with another polymer. The proportions of polymers in a blend depends upon the requirements of the end product. For example, polyvinyl chloride and chlorinated polyethylene may be blended in the ration of about 3:1 1:3. The polyvinyl chloride exhibits numerous desirable physical and electrical properties, and further improves the toughness and cut resistance of the cured composition. The chlorinated polyethylene enhances certain physical properties of the cured product such as flexibility at low temperatures and elongation measured at room temperature. In addition, both chlorinated polymers are flame retardant and therefore contribute to the flame retardance of the composition, and further the polyvinyl chloride is resistant to chemicals, moisture, and ozone. For many applications it is desirable or essential that a substantially non-polar alpha olefin be blended with the chlorinated polymer either as a processing aid or to enhance the properties of the end product. The substantially non-polar olefinic polymer may include homopolymers of alpha olefins, such as ethylene, propylene, isobutylene and the like; interpolymers consisting of two or more such alpha olefins such as ethylene-propylene copolymer or ethylene-propylene terpolymer; and interpolymers of an alpha olefin and an interpolymerizable monomer such as vinyl acetate, ethyl acrylate, butene-1 and the like; wherein the interpolymer comprises not less than 50 percent by weight of alpha olefin and preferably 75 to 90 percent by weight of the alpha olefin.

A low amount of polyethylene improves the processability of the chlorinated polymeric composition in that the polyethylene lowers the viscosity (plasticity) of the polymeric composition and acts as a lubricant. A suitable amount of polyethylene incorporated into the curable compound may range from about 2 to 10 percent by weight of the total polymer content. On the other hand, when relatively high amounts of polyethylene are used, such as in the range of about 25 to 50 percent by weight of total polymer, the polyethylene enhances a number of physical properties, e.g., tensile strength and cut-through resistance.

A suitable stabilizing agent is incorporated into the curable composition during the compounding operation to assure cross-likning of the polymers by neutralizing any free acid formed, thereby inhibiting a chain-like reaction resulting in the destruction of the polymer. Such stabilizing agents include, for example, lead oxide or litharge, tribasic lead silicate-sulphate, di-basic lead phthalate, basic lead silicate and magnesium oxide. The amount of stabilizing agent used will depend upon the amount of chlorinated polymer present, but generally will range from about 5 to 40 parts based on 100 parts of chlorinated polymer. Lower amounts than this generally will not be sufficient to assure the desired cross-linking, whereas there generally is no benefit in employing higher amounts also may be uneconomical.

Where desired, a small amount of triallyl cyanurate in the order of 0.5 to 5 or more parts by weight per 100 parts of polymer may be incorporated into the curable composition as a co-agent or co-reactant to enhance cross-linking. Additional components which desirably are present in the composition and compounded with the polymeric blend include, for example, a lubricant such as microcrystalline wax or calcium stearate to prevent the composition from sticking during fabrication, a small amount of pigment or coloring agent, and an antioxidant such as 4,4'-thiobis-(6-tert-butyl-m-cresol) or polymerized 1,2-dihydro-2,2,4-trimethyl quinoline to improve heat aging. Where desired, flame-retarding additives, such as antimony trioxide, may be incorporated in the compound.

A suitable cross-linking or curing agent is incorporated with the admixture during the compounding operation. In the typical compounding operation, such as on a 2-roll rubber mill or in a Banbury mixer, the polymeric materials are added first, then the stabilizer and any other additives, such as antioxidant, pigment, etc., and lastly the cross-linking agent. The compounding operation is conducted within a temperature range high enough to render the admixture sufficiently plastic to work, but below the reacting temperature or decomposition temperature of the cross-linking agent so that the cross-linking agent will not decompose thereby causing at least partial or incipient curing of the polymeric stock during the normal mixing cycle. Desirably, the cross-linking agent employed in the operation is an organic peroxide, such as a tertiary peroxide, and characterized by at least one unit of the structure

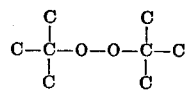

which decomposes at a temperature in excess of about 275° F. The use of these peroxide cross-linking agents in effecting cross-linking of polymers is adequately described in U.S. Pats. 3,079,370; 2,888,424; 3,086,966; and 3,214,422. The most commonly used peroxide cross-linking agent, and the agent preferred, is di-α-cumyl peroxide. Other useful cross-linking agents include the tertiary diperoxides such as 2,5-dimethyl-2,5-(t-butyl peroxy) hexane and 2,5-dimethyl-2,5(t-butyl peroxy) hexyne-3, and the like diperoxy and triperoxy compounds.

The proportion of peroxide cross-linking agent used depends largely on the mechanical properties sought in the cured product, for example, hot tensile strength. A range of from about 0.5 to 10 parts by weight of peroxide per hundred parts of polymer satisfies most requirements, and the usual proportion is of the order of two to four parts peroxide. In a typical production operation employing a a tertiary peroxide as a cross-linking agent, compounding is conducted at a temperature of from about 200 to 275° F. If compounding is conducted at a temperature much higher than the stated maximum, the peroxide will decompose thereby causing premature curing of at least a portion of the polymer. As a consequence, the compound will be difficult to fabricate and the final product will exhibit an irregular or roughened surface. The resulting compounded admixture is subsequently fabricated as by extrusion to provide an insulation cover for wire or cable. The fabricated cover is then cross-linked such as by conventional steam curing at about 225 to 250 p.s.i.g.

The cured product, manifesting white areas or spots, is passed through a polar organic solvent, desirably maintained at room temperature, e.g., ethylene dichloride, tetrahydrofuran. The polar organic solvent evaporates rapidly from the surface or may be washed off with water, thereby obviating the need for rubbing or buffing, although it may be desirable to provide an exhaust system in the area. By reason of this unique treatment, any white areas or spots appearing on the surfaces of the cured product are removed thereby leaving a solid colored surface.

In the accompanying figure, there is illustrated diagrammatically the process of this invention for making insulated wire or cable. A metal conductor 10 is passed from a pay-out reel 12 through an extruder 14 where the chlorinated polymeric composition, having incorporated therein a suitable curing agent, is extruded to form a coating or insulation over the conductor. The insulated conductor 16 emerging from the extruder is passed through a curing oven 18 where the coating is cured by conventional steam curing at high pressure whereby cross-linking of the polymer is effected. The insulated wire is then passed through a bath 20 of an organic solvent, e.g., ethylene dichloride, which area is desirably provided with an exhaust system (not shown). The completed wire product having a cured composition substantially free of white spots may be washed with water for slow evaporating solvents (not shown) and then is wound on take-up reel 22.

The invention is further illustrated by the following examples: An insulation composition was prepared comprising, by weight, 38 parts polyethylene, 31 parts chlorinated polyethylene, 31 parts polyvinyl chloride, 30 parts basic lead silicate, 3.5 parts di-α-cumyl peroxide curing agent (90 percent active), and a very small quantity of other additives. The compounded composition extruded at a wall thickness of 0.065 inch on a 4/0 A.W.G. stranded tinned copper conductor, and cured in a steam chamber maintained at a pressure of about 250 p.s.i.g. The surface of the cured product manifested white areas or spots, but upon treatment with the following polar organic solvents, the white spots were removed: tetrahydrofuran, ethylene dichloride, methyl ethyl ketone, methyl isobutyl ketone, 3-pentanone, cyclohexanone, butyl cellosolve acetate, butyl acetate, α-chloronaphthalene, dimethyl formamide, phenyl sulfide, perchloroethylene (121° C.), chloroform, acetone, and 1,1,2,2-tetrabromoethane.

We claim:
1. A method for manufacturing cross-linked chlorinated polymer comprising (a) admixing the chlorinated polymer selected from the group consisting of chlorinated poly- olefin, chlorosulfonated polyolefin, polyvinyl chloride, and blends thereof, a lead stabilizer for said chlorinated polymer, and a cross-linking agent, (b) cross-linking the resulting admixture under steam pressure, (c) passing the resulting cross-linked product through an organic solvent capable of removing white areas appearing on the cross-linked product, and removing the solvent whereby said white areas are removed from the cross-linked product by the action of the solvent.

2. The method according to claim 1 wherein said chlorinated polymer is chlorinated polyethylene.

3. A method according to claim 1 wherein said polymer comprises a blend of chlorinated polyethylene and polyvinyl chloride.

4. A method according to claim 1 wherein said chlorinated polymer is blended with polyethylene.

5. A method according to claim 1 wherein said cross-linking agent is an organic peroxide.

6. A method according to claim 1 wherein said solvent is ethylene dichloride.

7. A method according to claim 1 wherein said solvent is tetrahydrofuran.

8. A method for manufacturing cross-linked chlorinated polymer comprising (a) admixing polyvinyl chloride and chlorinated polyethylene in the ratio of about 3:1 to 1:3 and polyethylene in the range of about 2 to 50 percent by weight of the total weight of polymer, a lead stabilizer for said chlorinated polymers, and di-α-cumyl peroxide, (b) cross-linking the resulting admixture under steam pressure, (c) passing the resulting cross-linked product through an organic solvent selected from the group consisting of tetrahydrofuran and ethylene dichloride and removing the solvent whereby white areas appearing on the cross-linked product are removed therefrom by the action of the solvent.

References Cited

UNITED STATES PATENTS 3,326,828  6/1967  Melio _____ 260—23

OTHER REFERENCES

Hofmann—Vulcanization and Vulcanization Agents-Textbook, June 1968, pp. 54–55.

MURRAY TILLMAN, Primary Examiner

C. SECCURO, Assistant Examiner

U.S. Cl. X.R.

260—23 XA, 45.75 R, 45.9 R, 45.95, 88.7 R, 89.1, 89.5, 92.8 A, 94.9 H, 94.9 GA, 96 HA